US012593284B2

(12) United States Patent
Koskela et al.

(10) Patent No.: US 12,593,284 B2
(45) Date of Patent: Mar. 31, 2026

(54) APPARATUS, METHODS, AND COMPUTER PROGRAMS

(71) Applicant: Nokia Technologies OY, Espoo (FI)

(72) Inventors: Timo Koskela, Oulu (FI); Mihai Enescu, Espoo (FI); Sami-Jukka Hakola, Kempele (FI); Samantha Caporal Del Barrio, Aalborg (DK); Matha Deghel, Montrouge (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 386 days.

(21) Appl. No.: 18/041,296

(22) PCT Filed: Aug. 13, 2020

(86) PCT No.: PCT/EP2020/072766
§ 371 (c)(1),
(2) Date: Feb. 10, 2023

(87) PCT Pub. No.: WO2022/033691
PCT Pub. Date: Feb. 17, 2022

(65) Prior Publication Data
US 2023/0328657 A1     Oct. 12, 2023

(51) Int. Cl.
*H04W 52/14*          (2009.01)
*H04W 52/36*          (2009.01)
(52) U.S. Cl.
CPC ....... *H04W 52/146* (2013.01); *H04W 52/367* (2013.01)

(58) Field of Classification Search
CPC .......................... H04W 52/146; H04W 52/367
See application file for complete search history.

(56) References Cited

U.S. PATENT DOCUMENTS

| | | | |
|---|---|---|---|
| 2012/0224552 A1 | 9/2012 | Feuersanger et al. | |
| 2016/0165547 A1* | 6/2016 | Ouchi ...................... | H04L 5/14 |
| | | | 455/522 |
| 2018/0167897 A1 | 6/2018 | Sampath et al. | |
| 2019/0104477 A1 | 4/2019 | MolavianJazi et al. | |
| 2019/0200365 A1 | 6/2019 | Sampath et al. | |
| 2019/0254081 A1 | 8/2019 | Li et al. | |
| 2019/0261289 A1* | 8/2019 | Raghavan ........... | H04W 52/367 |
| 2019/0306850 A1 | 10/2019 | Zhang et al. | |
| 2020/0053745 A1 | 2/2020 | Luo et al. | |

(Continued)

FOREIGN PATENT DOCUMENTS

| | | |
|---|---|---|
| CN | 111164906 A | 5/2020 |
| CN | 111183593 A | 5/2020 |

(Continued)

OTHER PUBLICATIONS

Apple, "Considerations on multi-panel and MPE in FR2", 3GPP TSG RAN WG1 #97, R1-1907343, (May 13-17, 2019), 6 pages.

(Continued)

*Primary Examiner* — Zhitong Chen
(74) *Attorney, Agent, or Firm* — ALSTON & BIRD LLP

(57) ABSTRACT

There is provided an apparatus for a terminal, apparatus for a terminal, the apparatus being caused to determine that at least one uplink resource is associated with a reduced uplink transmission power; and transmit an identification of the at least one uplink resource to a network apparatus.

15 Claims, 6 Drawing Sheets

(56) References Cited

U.S. PATENT DOCUMENTS

| | | | |
|---|---|---|---|
| 2020/0112926 A1 | 4/2020 | Laghate et al. | |
| 2020/0145080 A1 | 5/2020 | Tang et al. | |
| 2020/0145927 A1 | 5/2020 | Sun et al. | |
| 2020/0359340 A1* | 11/2020 | Feuersaenger | H04L 5/0046 |
| 2021/0314931 A1 | 10/2021 | Farag et al. | |
| 2022/0007299 A1 | 1/2022 | Rahman et al. | |
| 2022/0116891 A1 | 4/2022 | Yao et al. | |

FOREIGN PATENT DOCUMENTS

| | | | |
|---|---|---|---|
| EP | 2317815 A1 | 5/2011 | |
| EP | 2592769 A1 | 5/2013 | |
| EP | 3799487 A1 | 3/2021 | |
| EP | 3979724 A1 | 4/2022 | |
| IN | 202037024920 A | 7/2020 | |
| WO | WO-2007051140 A2 | 5/2007 | |
| WO | WO 2019/126264 A1 | 6/2019 | |
| WO | WO 2019/160669 A1 | 8/2019 | |
| WO | WO-2019227444 A1 | 12/2019 | |
| WO | 2020/143761 A1 | 7/2020 | |
| WO | WO 2020/140353 A1 | 7/2020 | |
| WO | WO-2020/259852 A1 | 12/2020 | |
| WO | WO-2021-008710 A1 | 1/2021 | |
| WO | WO-2021/052716 A1 | 3/2021 | |
| WO | 2021/159284 A1 | 8/2021 | |

OTHER PUBLICATIONS

LG Electronics, "Feature lead summary of Enhancements on Multi-beam Operations", 3GPP TSG RAN WG1 Meeting #96bis, R1-1905712, (Apr. 8-12, 2019), 23 pages.
Office Action for European Application No. 20757289.2 dated Sep. 23, 2024, 5 pages.
First Examination Report for Indian Application No. 202347015000 dated Aug. 2, 2023, 9 pages.
Nokia et al., "UE FR2 MPE Enhancements and Solutions", 3GPP TSG-RAN WG4 Meeting #95-e, R4-2006510, (May 25-Jun. 5, 2020), 4 pages.
Office Action for Japanese Application No. 2023-510313 dated Apr. 4, 2024, 12 pages.
Qualcomm Incorporated, "Enhancements on Multi-Beam Operation", 3GPP TSG RAN WG1 Meeting #102-e, R1-2006790, (Aug. 17-28, 2020), 7 pages.
ZTE, "Enhancement on FR2 Mpe Mitigation", 3GPP TSG RAN WG1 Meeting #100-e, R1-2000245, (Feb. 24-Mar. 6, 2020), 3 pages.

Office Action for Japanese Application No. 2023-510313 dated Dec. 19, 2024, 11 pages.
Office Action for Chinese Application No. 202080106168.4 dated Mar. 26, 2025, 21 pages.
Office Action for Chinese Application No. 202080106168.4 dated Oct. 28, 2024, 21 pages.
Apple, "P-MPR Reporting", 3GPP TSG-RAN WG2 Meeting #111-e, R2-2007123, (Aug. 17-28, 2020), 4 pages.
Ericsson, "Discussion on MPE enhancements", 3GPP TSG-RAN WG2 #1 11-e, Tdoc R2-2008093, (Aug. 17-28, 2020), 6 pages.
Ericsson, "Implementing MPE enhancements", 3GPP TSG-RAN WG2 Meeting #111-e, Change Request CR 0748, R2-2008094, (Aug. 17-28, 2020), 10 pages.
Ericsson, "Implementing MPE enhancements", 3GPP TSG-RAN WG2 Meeting #111-e, Change Request CR 1640, R2-2008095, (Aug. 17-28, 2020), 6 pages.
Interdigital, "Addition of MPE reporting to TS 38.321", 3GPP RAN WG2 Meeting #111-e, R2-2007651, Change Request CR 0833, (Aug. 17-28, 2020), 3 pages.
Interdigital, "L2/3 aspects of MPE mitigation", 3GPP RAN WG2 Meeting #111-e, R2-2007649, (Aug. 17-28, 2020), 3 pages.
Nokia et al., "Introduction of FR2 MPE P=MPR reporting", 3GPP TSG-RAN WG2 Meeting #111 Electronic, Change Request CR 0210, R2-2007379, (Aug. 17-28, 2020), 4 pages.
ZTE, "Enhancements on Multi-beam Operation", 3GPP TSG RAN WG1 Meeting #102-e, R1-2005454, (Aug. 17-28, 2020), 11 pages.
Notice of Grant for Chinese Application No. 202080106168.4 dated Aug. 4, 2025, 10 pages.
Office Action for Japanese Application No. 2023-510313 dated Jul. 3, 2025, 4 pages.
International Search Report for International Application No. PCT/EP2020/072766 dated Apr. 21, 2021.
"WF on MPE Enhancements," 3GPP TSG-RAN WG4 Meeting #95-e, R4-2008479, May 25-Jun. 5, 2020, pp. 1-6.
"WF on MPE Enhancements," 3GPP TSG-RAN WG4 Meeting #94-e-bis, R4-2005734, Apr. 20-30, 2020, pp. 1-10.
3GPP TS 38.101-2, V16.3.1, 3rd Generation Partnership Project; Technical Specification Group Radio Access Network; NR; User Equipment (UE) Radio Transmission and Reception; Part 2: Range 2 Standalone (Release 16), pp. 1-170; Mar. 2020.
Decision to Grant for Japanese Application No. 2023-510313 dated Oct. 14, 2025, 4 pages.
Office Action for Vietnamese Application No. 1-2023-01568 dated Sep. 17, 2025, 3 pages.
Office Action for European Application No. 20757289.2 dated May 27, 2025, 4 pages.

* cited by examiner

601

602

701

APPARATUS, METHODS, AND COMPUTER PROGRAMS

CROSS-REFERENCE TO RELATED APPLICATIONS

This application is a national phase under 35 U.S.C. § 371 of PCT International Application No. PCT/EP2020/072766 which has an International filing date of Aug. 13, 2020, the entire contents of each of which are hereby incorporated by reference.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G radio or new radio (NR) access technology.

SUMMARY

According to a first aspect, there is provided an apparatus for a terminal, the apparatus comprising: means for determining that at least one uplink resource is associated with a reduced uplink transmission power; and means for transmitting an identification of the at least one uplink resource to a network apparatus.

The apparatus may comprise means for receiving configuration information that configures the apparatus with said means for determining.

The means for determining may comprise comparing a measured value of at least one parameter to at least one associated threshold for that parameter. There may be at least first and second parameters of said at least one parameters with respective first and second thresholds. At least one of the at least one parameters may have associated first and second thresholds, wherein the second threshold corresponds to a larger reduction in uplink transmission power than the first threshold, and wherein: when only said first threshold is exceeded, the means for transmitting may transmit at least one identification of those uplink resources assigned to the terminal for uplink transmission that are affected by said power reduction; and when both of said first and second thresholds are exceeded, the means for transmitting may transmit at least one identification of those uplink resources unassigned to the terminal for uplink resources that are affected by said power reduction.

The identification may be comprised within a bitmap. The bitmap may identify at least one uplink resource that is not associated with a reduced uplink transmission power.

The apparatus may comprise means for updating the bitmap in dependence on the uplink resource configuration.

A single identity may be used to identify a plurality of uplink resources that are associated with a reduced uplink transmission power.

The apparatus may comprise means for sending a cancellation indication to the network apparatus when the apparatus determines that an event causing the reduced uplink transmission power has passed.

The apparatus may comprise means for determining whether or not the apparatus is scheduled to transmit on at least one resource of a physical uplink shared channel and a physical uplink control channel that is associated with the reduced uplink transmission power; and wherein said means for transmitting may comprise means for transmitting said identification in response to determining that the apparatus is scheduled to transmit on at least one resource of a physical uplink shared channel or a physical uplink control channel that is associated with the reduced uplink transmission power.

The indication may provide an identification of an antenna panel on an apparatus that is configured to transmit on the at least one uplink resource.

According to a second aspect, there is provided a network apparatus, the network apparatus comprising: means for receiving from a terminal an identification of at least one uplink resource associated with a reduced uplink transmission power by the terminal.

The network apparatus may comprise means for transmitting configuration information that configures the apparatus to determine that at least one uplink resource is associated with a reduced uplink transmission power.

The configuration information may comprise comparing a measured value of at least one parameter to at least one associated threshold for that parameter.

There may be at least first and second parameters of said at least one parameters with respective first and second thresholds.

At least one of the at least one parameters may have associated first and second thresholds, wherein the second threshold corresponds to a larger reduction in uplink transmission power than the first threshold, and wherein: when only said first threshold is exceeded, the means for receiving may receive at least one identification of those uplink resources assigned to the terminal for uplink transmission that are affected by said power reduction; and when both of said first and second thresholds are exceeded, the means for receiving may receive at least one identification of those uplink resources unassigned to the terminal for uplink resources that are affected by said power reduction.

The identification may be comprised within a bitmap.

The bitmap may identify at least one uplink resource that is not associated with a reduced uplink transmission power.

A single identity may be used to identify a plurality of uplink resources that are associated with a reduced uplink transmission power.

The network apparatus may comprise means for receiving a cancellation indication from the terminal indicating that an event causing the reduced uplink transmission power has passed. The indication may provide an identification of an antenna panel on an apparatus that is configured to transmit on the at least one uplink resource.

According to a third aspect, there is provided a method for an apparatus for a terminal, the method comprising: determining that at least one uplink resource is associated with a reduced uplink transmission power; and transmitting an identification of the at least one uplink resource to a network apparatus.

The method may comprise receiving configuration information that configures the apparatus with said determining.

The determining may comprise comparing a measured value of at least one parameter to at least one associated threshold for that parameter. There may be at least first and second parameters of said at least one parameters with respective first and second thresholds. At least one of the at least one parameters may have associated first and second thresholds, wherein the second threshold corresponds to a larger reduction in uplink transmission power than the first threshold, and wherein: when only said first threshold is exceeded, the transmitting may transmit at least one identification of those uplink resources assigned to the terminal for uplink transmission that are affected by said power reduction; and when both of said first and second thresholds are exceeded, the transmitting may transmit at least one identification of those uplink resources unassigned to the terminal for uplink resources that are affected by said power reduction.

The identification may be comprised within a bitmap. The bitmap may identify at least one uplink resource that is not associated with a reduced uplink transmission power.

The method may comprise updating the bitmap in dependence on the uplink resource configuration.

A single identity may be used to identify a plurality of uplink resources that are associated with a reduced uplink transmission power.

The method may comprise sending a cancellation indication to the network apparatus when the apparatus determines that an event causing the reduced uplink transmission power has passed.

The method may comprise determining whether or not the apparatus is scheduled to transmit on at least one resource of a physical uplink shared channel and a physical uplink control channel that is associated with the reduced uplink transmission power; and wherein said transmitting may comprise transmitting said identification in response to determining that the apparatus is scheduled to transmit on at least one resource of a physical uplink shared channel or a physical uplink control channel that is associated with the reduced uplink transmission power.

The indication may provide an identification of an antenna panel on an apparatus that is configured to transmit on the at least one uplink resource.

According to a fourth aspect, there is provided a method for a network apparatus, the method comprising: receiving from a terminal an identification of at least one uplink resource associated with a reduced uplink transmission power by the terminal.

The method may comprise transmitting configuration information that configures the apparatus to determine that at least one uplink resource is associated with a reduced uplink transmission power.

The configuration information may comprise comparing a measured value of at least one parameter to at least one associated threshold for that parameter.

There may be at least first and second parameters of said at least one parameters with respective first and second thresholds.

At least one of the at least one parameters may have associated first and second thresholds, wherein the second threshold corresponds to a larger reduction in uplink transmission power than the first threshold, and wherein: when only said first threshold is exceeded, the receiving may receive at least one identification of those uplink resources assigned to the terminal for uplink transmission that are affected by said power reduction; and when both of said first and second thresholds are exceeded, the receiving may receive at least one identification of those uplink resources unassigned to the terminal for uplink resources that are affected by said power reduction.

The identification may be comprised within a bitmap.

The bitmap may identify at least one uplink resource that is not associated with a reduced uplink transmission power.

A single identity may be used to identify a plurality of uplink resources that are associated with a reduced uplink transmission power.

The method may comprise receiving a cancellation indication from the terminal indicating that an event causing the reduced uplink transmission power has passed. The indication may provide an identification of an antenna panel on an apparatus that is configured to transmit on the at least one uplink resource.

According to a fifth aspect, there is provided an apparatus for a terminal, the apparatus comprising at least one processor and at least one memory comprising code that, when executed by the at least one processor, causes the terminal to: determine that at least one uplink resource is associated with a reduced uplink transmission power; and transmit an identification of the at least one uplink resource to a network apparatus.

The terminal may be caused to receive configuration information that configures the apparatus with said means for determining.

The determining may comprise comparing a measured value of at least one parameter to at least one associated threshold for that parameter. There may be at least first and second parameters of said at least one parameters with respective first and second thresholds. At least one of the at least one parameters may have associated first and second thresholds, wherein the second threshold corresponds to a larger reduction in uplink transmission power than the first threshold, and wherein: when only said first threshold is exceeded, the transmitting may transmit at least one identification of those uplink resources assigned to the terminal for uplink transmission that are affected by said power reduction; and when both of said first and second thresholds are exceeded, the transmitting may transmit at least one identification of those uplink resources unassigned to the terminal for uplink resources that are affected by said power reduction.

The identification may be comprised within a bitmap. The bitmap may identify at least one uplink resource that is not associated with a reduced uplink transmission power.

The terminal may be caused to update the bitmap in dependence on the uplink resource configuration.

A single identity may be used to identify a plurality of uplink resources that are associated with a reduced uplink transmission power.

The terminal may be caused to send a cancellation indication to the network apparatus when the apparatus determines that an event causing the reduced uplink transmission power has passed.

The terminal may be caused to determine whether or not the apparatus is scheduled to transmit on at least one resource of a physical uplink shared channel and a physical uplink control channel that is associated with the reduced uplink transmission power; and wherein said transmitting may comprise transmitting said identification in response to determining that the apparatus is scheduled to transmit on at least one resource of a physical uplink shared channel or a physical uplink control channel that is associated with the reduced uplink transmission power.

The indication may provide an identification of an antenna panel on an apparatus that is configured to transmit on the at least one uplink resource.

According to a sixth aspect, there is provided a network apparatus, the network apparatus comprising at least one processor and at least one memory comprising code that, when executed by the at least one processor, causes the network apparatus to: receive from a terminal an identification of at least one uplink resource associated with a reduced uplink transmission power by the terminal.

The network apparatus may be caused to transmit configuration information that configures the apparatus to determine that at least one uplink resource is associated with a reduced uplink transmission power.

The configuration information may comprise comparing a measured value of at least one parameter to at least one associated threshold for that parameter.

There may be at least first and second parameters of said at least one parameters with respective first and second thresholds.

At least one of the at least one parameters may have associated first and second thresholds, wherein the second threshold corresponds to a larger reduction in uplink transmission power than the first threshold, and wherein: when only said first threshold is exceeded, the receiving may receive at least one identification of those uplink resources assigned to the terminal for uplink transmission that are affected by said power reduction; and when both of said first and second thresholds are exceeded, the receiving may receive at least one identification of those uplink resources unassigned to the terminal for uplink resources that are affected by said power reduction.

The identification may be comprised within a bitmap.

The bitmap may identify at least one uplink resource that is not associated with a reduced uplink transmission power.

A single identity may be used to identify a plurality of uplink resources that are associated with a reduced uplink transmission power.

The network apparatus may be caused to receive a cancellation indication from the terminal indicating that an event causing the reduced uplink transmission power has passed. The indication may provide an identification of an antenna panel on an apparatus that is configured to transmit on the at least one uplink resource.

According to a seventh aspect, there is provided non-transitory computer readable medium comprising program instructions for causing a terminal to perform at least the following: determine that at least one uplink resource is associated with a reduced uplink transmission power; and transmit an identification of the at least one uplink resource to a network apparatus.

The terminal may be caused to receive configuration information that configures the apparatus with said means for determining.

The determining may comprise comparing a measured value of at least one parameter to at least one associated threshold for that parameter. There may be at least first and second parameters of said at least one parameters with respective first and second thresholds. At least one of the at least one parameters may have associated first and second thresholds, wherein the second threshold corresponds to a larger reduction in uplink transmission power than the first threshold, and wherein: when only said first threshold is exceeded, the transmitting may transmit at least one identification of those uplink resources assigned to the terminal for uplink transmission that are affected by said power reduction; and when both of said first and second thresholds are exceeded, the transmitting may transmit at least one identification of those uplink resources unassigned to the terminal for uplink resources that are affected by said power reduction.

The identification may be comprised within a bitmap. The bitmap may identify at least one uplink resource that is not associated with a reduced uplink transmission power.

The terminal may be caused to update the bitmap in dependence on the uplink resource configuration.

A single identity may be used to identify a plurality of uplink resources that are associated with a reduced uplink transmission power.

The terminal may be caused to send a cancellation indication to the network apparatus when the apparatus determines that an event causing the reduced uplink transmission power has passed.

The terminal may be caused to determine whether or not the apparatus is scheduled to transmit on at least one resource of a physical uplink shared channel and a physical uplink control channel that is associated with the reduced uplink transmission power; and wherein said transmitting may comprise transmitting said identification in response to determining that the apparatus is scheduled to transmit on at least one resource of a physical uplink shared channel or a physical uplink control channel that is associated with the reduced uplink transmission power.

The indication may provide an identification of an antenna panel on an apparatus that is configured to transmit on the at least one uplink resource.

According to an eighth aspect, there is provided non-transitory computer readable medium comprising program instructions for causing a network apparatus to perform at least the following: receive from a terminal an identification of at least one uplink resource associated with a reduced uplink transmission power by the terminal.

The network apparatus may be caused to transmit configuration information that configures the apparatus to determine that at least one uplink resource is associated with a reduced uplink transmission power.

The configuration information may comprise comparing a measured value of at least one parameter to at least one associated threshold for that parameter.

There may be at least first and second parameters of said at least one parameters with respective first and second thresholds.

At least one of the at least one parameters may have associated first and second thresholds, wherein the second threshold corresponds to a larger reduction in uplink transmission power than the first threshold, and wherein: when only said first threshold is exceeded, the receiving may receive at least one identification of those uplink resources assigned to the terminal for uplink transmission that are affected by said power reduction; and when both of said first and second thresholds are exceeded, the receiving may receive at least one identification of those uplink resources unassigned to the terminal for uplink resources that are affected by said power reduction.

The identification may be comprised within a bitmap.

The bitmap may identify at least one uplink resource that is not associated with a reduced uplink transmission power.

A single identity may be used to identify a plurality of uplink resources that are associated with a reduced uplink transmission power.

The network apparatus may be caused to receive a cancellation indication from the terminal indicating that an event causing the reduced uplink transmission power has passed. The indication may provide an identification of an antenna panel on an apparatus that is configured to transmit on the at least one uplink resource.

According to a ninth aspect, there is provided an apparatus for a terminal, the apparatus comprising: determining circuitry for determining that at least one uplink resource is associated with a reduced uplink transmission power; and transmitting circuitry for transmitting an identification of the at least one uplink resource to a network apparatus.

The apparatus may comprise receiving circuitry for receiving configuration information that configures the apparatus with said determining circuitry.

The determining circuitry may comprise comparing a measured value of at least one parameter to at least one associated threshold for that parameter. There may be at least first and second parameters of said at least one parameters with respective first and second thresholds. At least one of the at least one parameters may have associated first and second thresholds, wherein the second threshold corresponds to a larger reduction in uplink transmission power than the first threshold, and wherein: when only said first threshold is exceeded, the transmitting circuitry may transmit at least one identification of those uplink resources assigned to the terminal for uplink transmission that are affected by said power reduction; and when both of said first and second thresholds are exceeded, the transmitting circuitry may transmit at least one identification of those uplink resources unassigned to the terminal for uplink resources that are affected by said power reduction.

The identification may be comprised within a bitmap. The bitmap may identify at least one uplink resource that is not associated with a reduced uplink transmission power.

The apparatus may comprise updating circuitry for updating the bitmap in dependence on the uplink resource configuration.

A single identity may be used to identify a plurality of uplink resources that are associated with a reduced uplink transmission power.

The apparatus may comprise sending circuitry for sending a cancellation indication to the network apparatus when the apparatus determines that an event causing the reduced uplink transmission power has passed.

The apparatus may comprise determining circuitry for determining whether or not the apparatus is scheduled to transmit on at least one resource of a physical uplink shared channel and a physical uplink control channel that is associated with the reduced uplink transmission power; and wherein said transmitting circuitry may comprise transmitting circuitry for transmitting said identification in response to determining that the apparatus is scheduled to transmit on at least one resource of a physical uplink shared channel or a physical uplink control channel that is associated with the reduced uplink transmission power.

The indication may provide an identification of an antenna panel on an apparatus that is configured to transmit on the at least one uplink resource.

According to a tenth aspect, there is provided a network apparatus, the network apparatus comprising: receiving circuitry for receiving from a terminal an identification of at least one uplink resource associated with a reduced uplink transmission power by the terminal.

The network apparatus may comprise transmitting circuitry for transmitting configuration information that configures the apparatus to determine that at least one uplink resource is associated with a reduced uplink transmission power.

The configuration information may comprise comparing a measured value of at least one parameter to at least one associated threshold for that parameter.

There may be at least first and second parameters of said at least one parameters with respective first and second thresholds.

At least one of the at least one parameters may have associated first and second thresholds, wherein the second threshold corresponds to a larger reduction in uplink transmission power than the first threshold, and wherein: when only said first threshold is exceeded, the receiving circuitry may receive at least one identification of those uplink resources assigned to the terminal for uplink transmission that are affected by said power reduction; and when both of said first and second thresholds are exceeded, the receiving circuitry may receive at least one identification of those uplink resources unassigned to the terminal for uplink resources that are affected by said power reduction.

The identification may be comprised within a bitmap.

The bitmap may identify at least one uplink resource that is not associated with a reduced uplink transmission power.

A single identity may be used to identify a plurality of uplink resources that are associated with a reduced uplink transmission power.

The network apparatus may comprise receiving circuitry for receiving a cancellation indication from the terminal indicating that an event causing the reduced uplink transmission power has passed. The indication may provide an identification of an antenna panel on an apparatus that is configured to transmit on the at least one uplink resource.

According to an eleventh aspect, there is provided a computer program comprising program instructions for causing a computer to perform any method as described above.

According to a twelfth aspect, there is provided a computer program product stored on a medium may cause an apparatus to perform any method as described herein.

According to a thirteenth aspect, there is provided an electronic device that may comprise apparatus as described herein.

According to a fourteenth aspect, there is provided a chipset that may comprise an apparatus as described herein.

Various other aspects are also described in the following detailed description and in the attached claims.

BRIEF DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a 5G wireless communication system are briefly explained with reference to FIG. 1.

Figure 1:
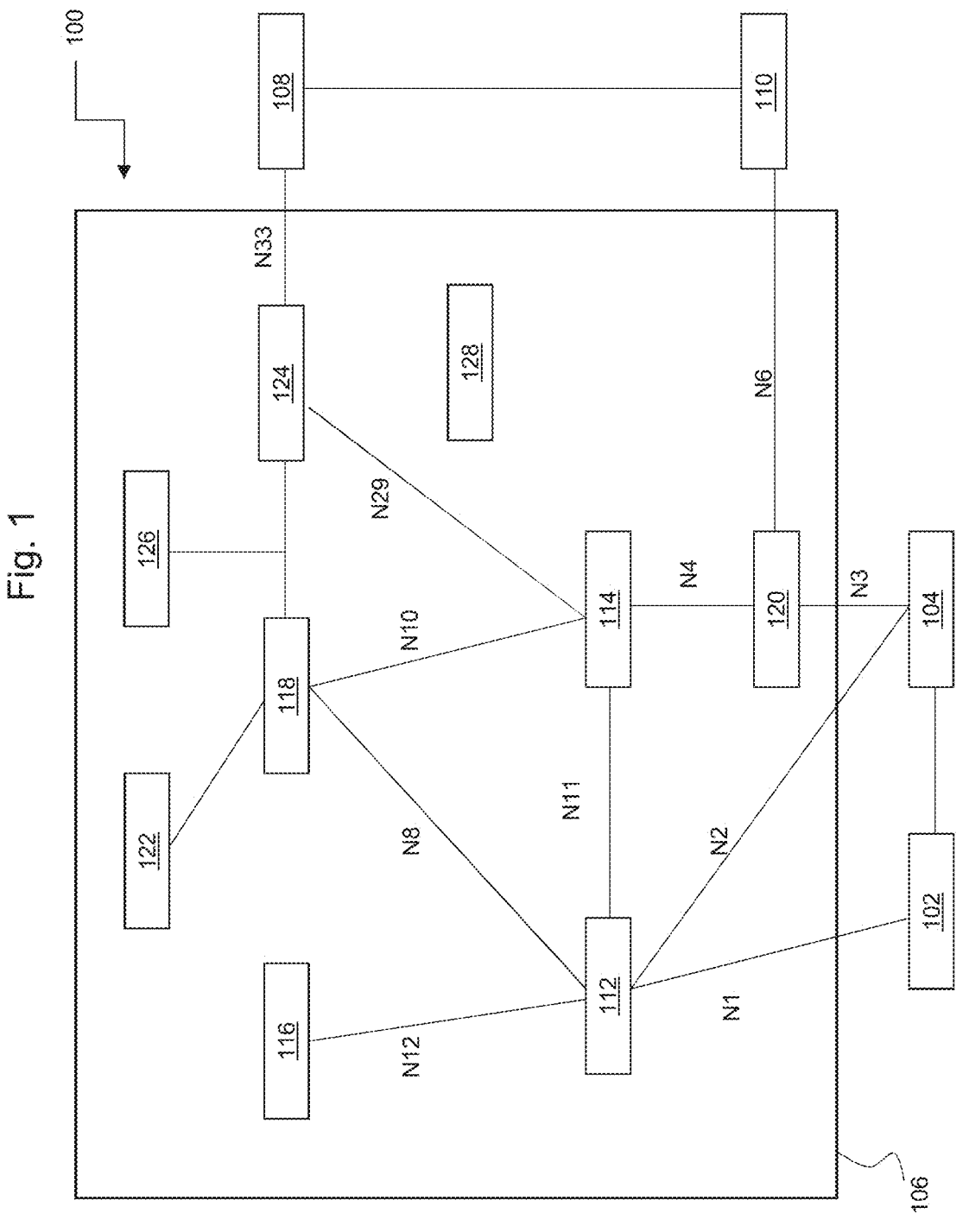
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (GNB) distributed unit functions connected to one or more gNodeB (GNB) centralized unit functions. The RAN may comprise one or more access nodes.

The 5GC 106 may comprise one or more access management functions (AMF) 112, one or more session management functions (SMF) 114, one or more authentication server functions (AUSF) 116, one or more unified data management (UDM) functions 118, one or more user plane functions (UPF) 120, one or more unified data repository (UDR) functions 122, one or more policy control (PCF) functions 128, and/or one or more network exposure functions (NEF) 124. Although PCF 128 is not depicted with its interfaces, it is understood that this is for clarity reasons and that PCF 126 may have a plurality of interfaces with other network functions, such as AMF 112 (via interface N15), SMF 114 (via interface N7), UDR 122 (through interface N36), network data analytics function (NWDAF) 126 (through interface N23), and many other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The number of online services dramatically increases every year, and, with it, the need for bandwidth. Extra bandwidth may be provided using the millimeter-wave (mmW) spectrum, which offers the possibility of using large portions of contiguous bandwidth to address high-throughput applications. Hence, the 5th Generation (5G) New Radio (NR) frequency spectrum aims to extends wavelengths to ranges well-above the previous 4th Generation (4G) one (400 MHz to 6 GHz—otherwise known as Frequency Range 1 (FR1)). This bandwidth extension may be called Frequency Range 2 (FR2). In current proposals for mmWave 5G NR, FR2 may comprise the frequencies between 24 GHz and 52.6 GHz. Extending the NR operation into the 52.6-71 GHz range is currently being discussed in 3GPP Rel17.

Operating at such high frequencies with high gain antennas has raised concerns for the health of the users. Since frequencies below 100 GHz are non-ionizing, the concern for health is limited to thermal heating of the body tissue while absorbing electromagnetic mmW energy. mmW frequencies yield penetration depths below 1 mm. Therefore possible thermal damage is limited to the surface of the skin and the eyes. Most of the energy is absorbed within the first 0.4 mm of the human skin at 42 GHz.

To eliminate these concerns, there is a standard on mmW regime that specifies and regulates the maximum power that may be transmitted by User Equipment (UE). Also, in many jurisdictions, Governmental exposure guidelines are in place to prevent health issues due to thermal effects. Below 6 GHz (e.g. LTE), Specific Absorption Rate (SAR) has been used to determine the exposure threshold. SAR measures the energy absorbed by the human body when exposed to electromagnetic fields. The SAR limitation in the U.S. is 1.6 W/kg averaged over 1-g tissue from FCC. In Europe, the SAR limitation is 2 W/kg averaged over 10-g tissue. The 1-g averaging provides a finer resolution for the study of energy absorption in the human body.

At mmW regime where the penetration depth is below 1 mm, even 1-g tissue is a large volume to accurately measure. Since it is difficult to define a meaningful volume for SAR evaluation, it has been commonly accepted to use Power Density (PD) and not SAR to set the restrictions on exposure at mmW frequencies. PD is a planar energy distribution as opposed to a volumetric one like SAR. The Maximum Permissible Exposure (MPE) is the regulation on PD for the mmWave regime. The FCC and ICNIRP set the threshold for MPE at 10 W/m$^2$ (1 mW/cm$^2$), for the general public, between 6 or 10 GHz respectively and 100 GHz. The energy absorbed by the human body increases as a function of the distance to the UE. Therefore, to comply with the MPE limit, the UE might have to reduce its output power if the user gets in close vicinity of the antenna.

As some 5G NR bands operate at very high frequencies (FR2 and above), they require high gain antennas to maintain the link budget. However, high gain antennas direct a lot of energy that might come towards the user, whom FCC protects by setting an MPE threshold. The UE, complying with MPE limitations, subsequently reduces its output power for uplink transmissions if it determines that the user has come into close vicinity of the antenna. This reduction in output power (at least 20 dB for come UEs) may be likely to lead to the UE losing the connection to the base station (gNB) (i.e. a Radio Link Failure (RLF) event may occur).

In 3GPP, two methods have been used and discussed to handle reduce the uplink power output by a UE: maxUplinkDutyCycle and P-PMR For maxUplinkDutyCycle, a duty cycle is defined that enables a UE to maintain its max transmit power while still meeting MPE requirements. This is done by averaging the power output over a defined time period such that some transmissions within the time period are made at a "normal" transmission output while other transmissions scheduled to be made within the time period are suppressed. The average power over this time period would fulfil the MPE limitations. As an example, the duty cycle values in FR1 may have a default value of 50%, with optionally reported values of 60%, 70%, 80%, 90% and 100%, and the averaging time/duty cycle observation period is typically in order of seconds/minutes depending on the system. Dynamic duty cycle will not be introduced in Rel-16. Instead, it is currently a fixed capability indicated using RRC signaling. However, it this may not be the case for future releases and other network types (i.e. non-5G networks).

For Power management Maximum Power Reduction (PMPR), a UE may apply a reduction to the uplink maximum available power for all of the uplink transmissions to comply with emission requirements. The UE may detect when to apply power reduction based on its UE's own determination, e.g. when a UE detects proximity of the human body, transmission power is reduced in the uplink. Therefore, on the device side, there may be available proximity sensors that are built into a device to detect nearby objects including humans. These components may be implemented in many ways including 60 GHz radars. Based on the proximity sensor, the device can autonomously back off its transmission power to comply with MPE requirements.

Enhanced solutions for FR2 MPE issues have been considered. In a recent meeting, it was agreed to consider further reporting an applied P-MPR value and duty cycle values, while there has been extensive discussion on how to implement into the specifications the RF exposure compliance mechanisms (namely into 3GPP Technical Specification 38.101-2).

When reporting P-MPR, periodic P-MPR reporting will not be introduced. Instead, a report will be triggered when the P-MPR is higher than a threshold (which may be configurable). The signalling mechanism via which this triggered report will be made has not been discussed (e.g. as extensions to currently defined signals/messages, via a new reporting message, etc.). However, it has been agreed that a P-MPR report value mapping table will be introduced in 3GPP Technical Specification 38.133.

Second, as mentioned above, dynamic duty cycle will not be introduced in Rel-16.

Beam based operation allows potentially multiple paths or beam pair links to be used for communication, where a beam pair link refers to a transmit beam at the transmitter and a receive beam at the receiver of the radio link between two nodes, such as between a UE and a gNB. Therefore duty cycle based MPE actions may be avoided through use of beam/path diversity for uplink transmissions. Such an arrangement would improve scheduling flexibility at the network, and may avoid unnecessarily limiting the uplink throughput outside of MPE events. This arrangement (i.e. beam/path diversity) may also be an improvement over reductions in transmission power to meet transmission requirement.

The following considers that, when potential alternative paths/beams exist, it would be useful for the UE to indicate this towards the network to avoid the UE reducing the UL transmission power more than necessary, and to avoid potential radio link failures. It is also useful for the UE to know when potential alterative paths/beams do not exist to mitigate against beam failures.

In particular, the following considers mechanisms for a UE to indicate to a network when the UE experiences MPE scenarios and will be operating under transmission power constraints with currently configured communication beams for uplink. In particular, the following considers mechanisms for identifying specific uplink transmission resources that are impacted by an MPE to a network apparatus and/or for identifying to a network apparatus specific uplink transmission resources that are not impacted by an MPE. The following further considers mechanisms for quickly recovering normal operation when MPE scenarios have ceased to avoid applying gNB uplink scheduling restrictions when they are no longer needed.

Figure 5:
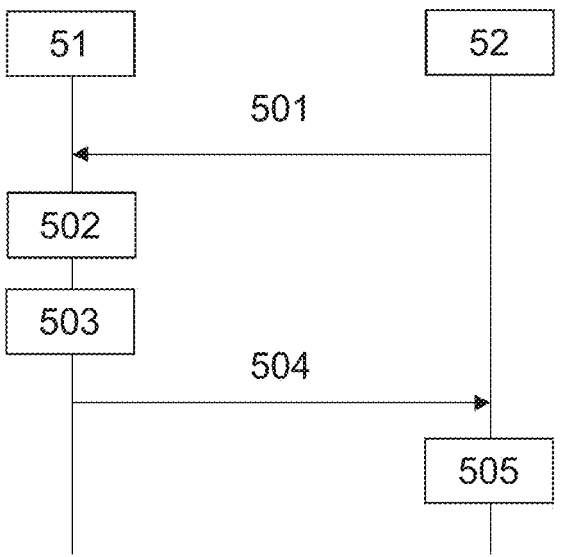
FIG. 5 shows a signalling diagram illustrating potential messages that may be exchanged.

FIG. 5 is a signalling diagram illustrating a proposed mechanism, and shows signals exchanged between a user equipment 51 and a network apparatus 52.

At 501, the network apparatus 52 sends a signal to the user equipment 51 comprising a configuration for configuring the UE to detect and/or report MPE events.

This configuration may comprise at least one threshold, and the UE may be triggered to report an MPE event if this threshold is exceeded. For example, with a threshold configuration of TH1, Threshold TH1 may be configured for any entry/bit location in a bitmap so that when the maximum power reduction (MPR) applied by the UE 51 for the resource indicated by that bitmap location exceeds TH1 an event is triggered, and the bit is set to indicate the event for affected resource. The UE 51 may be configured via the signalling to cancel the event and trigger a new report, when the MPR applied by UE is less than TH1.

In any additional MPE related reporting, the UE may be configured use the same thresholds. This may be useful when reporting candidate resources that would be unaffected by the MPE, such as when reporting candidate Synchronizations Signal (SS)/Physical Broadcast Channel (PBCH) Blocks resources.

The UE 51 may be configured to use a second threshold (TH2) via the signalling at 501. This second threshold TH1 may be applied when the UE 51 reports to cancel the MPE event. TH2 may be set higher than TH1.

It is understood that although MPR has been mentioned as being used for threshold triggering in the above, that other values may be used, such as threshold values for an uplink maximum power. Moreover, multiple threshold may be configured at the UE 51 via signalling from the network apparatus 52. These thresholds may be applied simultaneously (e.g. so that if any threshold is exceeded out of the configured thresholds, an event is detected (& subsequently reported)). These thresholds may be applied in succession (e.g. so that one threshold is applied until exceeded, and then a second, different, threshold is used after the exceeded threshold).

At 502, after configuring itself to detect MPE events based on the received configuration, the UE detects an MPE event. This may be performed through the use of thresholds, as discussed above.

At 503, the UE 51 determines to send an indication to the network apparatus 52 that indicates those resources impacted by the MPE event. This indication is sent to the network apparatus 52 at 504. This indication may be an explicit indication. One way of efficiently indicating resources impacted by the MPE event is to indicate one or more Transmission Configuration Indication (TCI) states impacted by the MPE event. At least one Transmission Configuration Indicator (TCI) state is dynamically sent provided to a UE (e.g. via a downlink control information message), and comprises configurations such as Quasi-co-location-relationships between the downlink reference signals in one Channel-state information reference signal set and the physical downlink shared channel demodulation reference signal ports. Therefore, the indication sent at 503 may comprise an identification of at least one TCI state impacted by the MPE event.

Optionally, prior to, or as part of, sending the indication at 504, the UE 51 may signal the network to request resources for reporting the MPE event. For example, a scheduling request and/or preamble-based signalling may be used to indicate that an MPE event has occurred and the UE 51 requests more resources to provide additional MPE-related information. The additional MPE-related information may be carried using any of a variety of different signalling channels and mechanisms. For example, the additional MPE-related information may be signalled to the network apparatus 52 by the UE 51 using a Physical Uplink Control Channel (PUCCH), a Physical Uplink Shared Chanel (PUSCH), via a Medium Access Control Control Element (MAC CE), and/or via Radio Resource Control signalling At 505, having received the indication transmitted at 504, the network apparatus makes network planning decisions to account for the MPE event and the impacted resources. Examples of how this may be done are discussed below.

The UE 51 may cancel the reporting event in at least one of a plurality of situations. For example, the UE 51 may cancel the reporting event when a new uplink resource is configured, and/or after receiving an indication that the UE may not expect the network apparatus to schedule on the specific resources, and/or the UE is allowed to ignore the UL grants e.g. periodic grants on the resources. As an example, when a UE expects that a network apparatus to schedule the UE to transmit uplink with an assumption that the UE may need to mitigate the MPE on those uplink resource, the event may be considered to be triggered or pending and not cancelled. In other words, the UE may be configured to report at least once (e.g. report once or report periodically or report N-times) when the UE determines that an MPE event has occurred or new information is provided. As a further example, the UE may stop periodic reporting (e.g., when MPE restriction is not anymore applicable), or the UE may be configured to report whenever an MPE situation changes, such as when. new resources are affected or when some resources/beams/links stop being affected. The network apparatus may also explicitly cancel the UE reporting on MPE events by signaling the UE to configure the UE to stop reporting on MPE events.

Figures 6, 7:
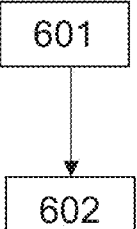
FIGS. 6 and 7 are flow charts illustrating potential operations by apparatuses.

FIGS. 6 and 7 are flow charts illustrating potential actions that may be performed by the interacting apparatuses discussed above.

FIG. 6 shows potential operations performed by an apparatus for a terminal.

At 601, the apparatus determines that at least one uplink resource is associated with a reduced uplink transmission power. This may be determined in response to the terminal determining that it needs to comply with an MPE requirement. The identification thus indicates a specific resource that is associated with a reduced uplink transmission power. The specific resource may be allocated to the terminal for uplink transmission when the identification is received. The specific resource may be not allocated to the terminal for uplink transmission when the identification is received.

How a terminal determines that an MPE requirement is to be met may be configured by signalling received by the terminal from a network apparatus. Such configuration signalling may configure the terminal with at least one threshold associated with at least one parameter. The parameter may be, for example, maximum power reduction and/or other parameters discussed herein). The determining may comprise comparing a measured value of the at least one parameter to the threshold and taking an action in dependence on whether the threshold is met and/or exceeded. For example, the terminal may determine that an MPE requirement is to be met when the threshold is met and/or exceeded. The terminal may be configured to make the measurement itself. To determine whether a specific MPE requirement needs to be met may also be determined internally by the terminal. The terminal may report to the network apparatus that is the terminal is not able to use specific resources without reduction of maximum power. The amount of reduction may be indicated by the terminal to the network apparatus so that it explicitly signals the value. The amount of the reduction may be assumed to be a specific/default value that is known by both the network apparatus and the terminal (e.g. the default amount of reduction may be predetermined). In this latter case, the amount of reduction is not explicitly signalled by the terminal to the network apparatus.

There may be at least first and second parameters of the at least one parameters, each having respective first and second thresholds.

At least one of the at least one parameters may have associated first and second thresholds. The second threshold may correspond to a larger reduction in uplink transmission power than the first threshold. When only the first threshold is exceeded, the transmitting may transmit at least one identification of those uplink resources assigned to the terminal for uplink transmission that are affected by said power reduction (also referred to herein as reactive reporting.) When both of said first and second thresholds are exceeded, the terminal may transmit identifications of at least of those uplink resources currently unassigned to the terminal for uplink resources that are affected by said power reduction (also referred to herein as proactive reporting).

At 602, the apparatus transmits an identification of the at least one uplink resource to a network apparatus. The identification may be comprised within a bitmap. The bitmap may identify at least one uplink resource that is not associated with (i.e. that is not impacted by) a reduced uplink transmission power. A single identity may be used to identify a plurality of uplink resources that are associated with a reduced uplink transmission power. For example, resources/channels that are commonly considered by the network apparatus and the terminal to be quasi-co-located may form a set that can be indicated by a indication to one of the resources/channels in the quasi-co-located set. The resources/channels may be commonly considered to be quasi-co-located following a signalling of this quasi-co-location by the network apparatus to the terminal.

The apparatus may cause the terminal to send a cancellation indication to the network apparatus when the apparatus determines that an event causing the reduced uplink transmission power has passed. The cancellation instruction may thus indicate to the network that no uplink resources allocated to the terminal are currently subject to transmission power limitations/reductions.

FIG. 7 illustrates potential actions that may be performed by a network apparatus interacting with the apparatus of FIG. 6. The network apparatus may be a network access point, such as a gNB or equivalent.

At 701, the network apparatus receives from a terminal an identification of at least one uplink resource associated with a reduced uplink transmission power by the terminal. The identification thus indicates a specific resource that is associated with a reduced uplink transmission power. The specific resource may be allocated to the terminal for uplink transmission when the identification is received (reactive reporting by the terminal). The specific resource may be not allocated to the terminal for uplink transmission when the identification is received (proactive reporting by the terminal).

As discussed above, how a terminal determines that an MPE requirement is to be met may be configured by signalling transmitted to the terminal by the network apparatus. Such configuration signalling may comprise at least one threshold associated with at least one parameter. The parameter may be, for example, maximum power reduction and/or other parameters discussed herein.

There may be at least first and second parameters of the at least one parameters, each having respective first and second thresholds.

At least one of the at least one parameters may have has associated first and second thresholds. The second threshold may correspond to a larger reduction in uplink transmission power than the first threshold. When only the first threshold is exceeded, the transmitting may transmit at least one identification of those uplink resources assigned to the terminal for uplink transmission that are affected by said power reduction. This is part of the described reactive reporting. When both of said first and second thresholds are exceeded, the terminal may transmit identifications of at least of those uplink resources currently unassigned to the terminal for uplink resources that are affected by said power reduction. This is part of the described proactive reporting.

The network apparatus may receive cancellation indication terminal. The cancellation instruction may indicate to the network apparatus that no uplink resources allocated to the terminal are currently subject to transmission power limitations/reductions.

The following will consider more specific examples of the presently described techniques in which a UE is configured to indicate an MPE event and/or to cancel the indicated MPE event. This may be performed either proactively (i.e. by controlling the MPE event) or reactively (i.e. in response to an MPE event occurring).

First, a UE determining and transmitting resource specific information to indicate an MPE event to a network apparatus will be considered.

As a first example, the transmitted indication is based on Synchronizations Signal (SS)/Physical Broadcast Channel (PBCH) Blocks, which are known as SSBs, and/or Channel State Information Reference Signal (CSI-RS) resources.

In LTE, all eNodeBs continually transmit a Cell-specific Reference Signal (CRS) for enabling a UE to measure the cell quality of neighboring cells. This CRS is not present in 5G NR. Instead, a UE in 5G NR performs cell signal measurements by using SSBs. These SSBs are comprised of Synchronization Signals (SS) and Physical Broadcast Channel (PBCH) that have a longer transmission periodicity than the LTE CRS.

Therefore, the present example may use identifiers of the SSB and/or CSI-RS to indicate specific resources. This may be used in combination with the concept of quasi-co-location (QCL). In QCL, properties of a channel over which a symbol is sent on one antenna port can be inferred from the properties of a channel over which a symbol on another antenna port is conveyed. Consequently, if a first channel is affected by an MPE event, then quasi co-located sources to that channel would also be affected.

In the present example, the SSB and/or CSI-RS may be determined according to the spatial relation information configured for the PUSCH and/or for the PUCCH. For example, the spatial relation may be determined using a spatial relation resource such as a sounding reference signal (SRS) resource or a Non-Zero Power (NZP) CSI-RS. In particular, for each PUCCH resource determined as being affected by the MPE event, the UE may determine a reference Quasi-co-location (QCL) source using QCL source chain back to the specific SSB. The indication for these types of resources may then be signalled using at least one SSB index, or a bitmap in which each bitmap entry refers to a specific SSB time index location.

As a second example, the transmitted indication is based on PUCCH Resource IDs. In this case, the transmitted indication may comprise specific fields for each configured PUCCH Resource ID. For an MPE indication, the UE may determine whether a specific PUCCH resource ID is affected directly by the MPE event or if the PUCCH resource ID is associated with PUSCH transmission. When that specific resource is any one of these, then the UE may transmit an indication that that specific resource is a affected by an MPE event. If at least one PUCCH group is configured (in Rel16 and onwards there can be maximum of four PUCCH groups defined from a spatial relation point of view), the indication may be based on a PUCCH group ID. Using a PUCCH group based indication instead of indicating individual resources may provide lower a overhead.

As a third example, the transmitted indication is based on at least one Sounding Reference Signal (SRS) resource ID (SRI). An SRS is a reference signal transmitted by a UE to a network apparatus that can be used by a network apparatus to determine an uplink channel quality. An SRS may be configured at a UE via signalling from a network apparatus, and may relate to resources not allocated to the UE for communication with the network apparatus. Measurements made on an SRS may thus provide some indication of how the UE would perform on other parts of a time-frequency resource grid. A Sounding Reference Signal (SRS) resource ID (SRI) identifies at least one time-frequency resource/pattern used for an SRS. The UE may transmit the indication of an MPE event using at least one SRS ID used for a PUSCH spatial relation configured by Downlink Control Information sent by the network apparatus.

As a fourth example, the transmitted indication is based on at least one Active Transmission Configuration Indication (TCI) State of the Physical Downlink Shared Channel (PDSCH). As mentioned above, a TCI state defines configurations such as QCL-relationships between the downlink reference signals in one CSI-RS set and the PDSCH DMRS ports. In the case, based on the configured uplink resources, the UE determines which active TCI States for PDSCH correspond to particular uplink resources and, when indicating the MPE event, the UE indicates one or more active TCI State index(es) to identify those particular UL resources as being affected.

As a fifth example, the transmitted indication is based on the active TCI states for uplink transmission in a common TCI framework for uplink and downlink beam management. In this case, the MPE indication may comprise an indication of a set of active TCI States for the PUSCH, or the PUCCH or both.

As a sixth example, we refer to antenna panels that contain antenna elements. For example, an apparatus may have two antenna panels on opposing sides of the apparatus. As another example, an apparatus may have four panels, with each panel on a different side of the device. Antenna panels with more than one antenna element are capable of performing beamforming. When panel information (i.e. how many panels and what are the identifiers of each panel) has been established between the network apparatus and the UE, the transmitted indication may be based on antenna panel specific identifiers. As an example, the network apparatus may configure the UE with antenna panel specific beam reporting, and the UE may determine an indication of affected resources based on the antenna panel IDs.

As an example, the UE may have 4 panels, and the UE may transmit at least one indication indicating which of the panels is affected by an MPE and/or which of the panels is not affected by an MPE. The network apparatus can determine specific uplink resources or candidates for uplink spatial relation resources based on panel specific downlink reference signal reporting (or Sounding Reference Signal information). As a further example, if a UE is equipped with two (or more) antenna panels (labelled #1 and #2 in the present example), the UE may indicate to the network apparatus that panel #2 is affected by the MPE. This indication may thus render the network apparatus aware of the affected uplink transmission resources for PUCCH/PUSCH transmission through the association with the panel ID, which will allow the network apparatus to avoid scheduling uplink transmissions for the UE on those resource. Further, if the UE indicates that panel #1 is not affected by an MPE, the UE may indicate this to the network apparatus. Receipt of this indication will render the network apparatus aware that it may be beneficial to use the resources associated with panel #1 for UE uplink transmissions. Therefore, on receiving an indication that certain resources are unaffected by an MPE for a particular antenna panel of a UE, the network apparatus may schedule UE uplink transmissions for those certain resources.

The UE may a network apparatus with an provide MPE-related restriction indication per UE transmission panel, wherein the panel is identified by any of an explicit antenna panel identity, by a sounding reference signal (SRS) resource set ID, by a PUCCH group identity, and/or by correspondence to a set of downlink Reference Signals that are potential spatial source Reference Signals uplink transmission beams. As examples, any of specific SRS resources or group ID or downlink reference signal ID may implicitly indicate to network apparatus that specific panel is affected.

The indication to the network apparatus may be made implicitly when an antenna panel identity is not explicitly used. In this example UE may indicate that the restrictions may be defined on a per antenna panel duty cycle due to MPE or per SRS resource identity, PUCCH group identity, PUCCH identity, PUSCH identity, downlink reference signal identity. The MPE restrictions applied by a UE may be defined in terms of a per antenna panel maximum allowed transmission power/EIRP due to MPE.

In some examples, the UE may indicate, for each antenna panel identity, and/or SRS resource set identity, and/or PUCCH identity, and/or PUSCH resource, and/or downlink reference signal identity, whether or not that antenna panel, resource, and/or resource identity is affected by MPE and the amount of PMPR or duty cycle per indicated resource/panel. These listed resources, resource identities and antenna panel identifiers may be generally considered to be identities and/or resources that correspond to PUSCH/PUCCHs used as a reference for aligning uplink transmission beam.

In the above examples, the information provided in the MPE indication may comprise a resource specific indication. The bit-width per resource in the MPE indication may be one or more bits. In other words, a resource may be indicated using one or more bits. The indication may be in the form of a bitmap. In this case, an indication may be set such that at least one of the bits in the resource specific bitmap indicates a resource being affected by the MPE. The resource may be indicated as being affected by an MPE based on e.g. single threshold. The bitmap may also indicate those resources not affected by the MPE. For example, a bit representing a specific resource in the bitmap may set to '1' to show that that resource is affected by an MPE event, and set to '0' to indicate that that resource is unaffected by the MPE event (or vice versa).

In one example, a UE may receive a configuration from the network apparatus for providing at least one of a reactive (first type) and a proactive (second type) indication to network apparatus on the MPE event.

The reactive indication may comprise determining at a UE, whether or not the network apparatus has scheduled at least one transmission on at least one PUSCH or PUCCH resource that is affected by an MPE restriction that is configured/determined to be reported by UE. If the network apparatus has scheduled at least one transmission, the MPE event is triggered and an MPE indication is generated and sent to the network apparatus by the UE. Alternatively or additionally, If the UE has determined that it has transmitted or will be transmitting at least one transmission on the channel (PUSCH/PUSCH) or the associated resource affected by MPE, the MPE event is triggered and an MPE indication is generated and sent to the network apparatus by the UE. As an example, UE may be configured to perform periodic transmissions on uplink or network has scheduled UE on downlink and UE is providing DL feedback on uplink. In another example, if the network has scheduled or performed at least one transmission on a Physical Downlink Control Channel (PDCCH) or a PDSCH resource that corresponds to the configured PUCCH/PUSCH resource, the UE may indicate to the network apparatus that an MPE event or a potential MPE event or a proactive MPE event is expected to occur on that resource. The event reporting may be performed as described herein.

The proactive MPE event may be determined when the UE, immediately or based on observation period over a predetermined time duration, determines whether or not a UL resource will/would be affected by MPE. If it is determined that an uplink resource will/would be affected, this indication is reported in advance (i.e. without the UE being currently scheduled to use that resource). Therefore the UE proactively triggers the report that it may experience uplink transmission restrictions on the indicated resources.

In the combined proactive/reactive approach, the UE may be configured with one or more threshold values (such as maximum power reduction) for triggering an event. When the amount of MPR is within a first threshold, the UE may be configured with reactive event. For example, when there is no need to reduce a transmission power by more than a first threshold (which is less than second threshold), the UE may trigger a reactive event when the network apparatus schedules UL transmission or when the UE performs transmission on one or more UL resources (e.g. uplink channels such as PUCCH and/or PUSCH or the corresponding resources that are associated with the transmission) affected by MPE. However, when the amount of MPR is more than second threshold (higher than the first threshold), the UE may indicate the MPE event proactively, and preferably prior to the network apparatus scheduling the UE on the affected resources, and/or the UE performing transmission on the affected resources.

Although MPR-based thresholds have been discussed in the above, it is understood that this is just one type of parameter that may be used to determine an MPE event, and that other parameters may be used (and applied) in the above example. For example, a counter-based mechanism may be used to calculate the number of scheduling events for the affected resource (e.g. the number of scheduling events associated with a specific resource within a time window), and this may be used to set thresholds for when/if to transmit at least one MPE indication.

The UE may also be configured to provide indication of both MPE affected resources and resources that are not affected. One of these examples, is discussed above in relation to a bitmap. In this case, when the UE is configured with a downlink reference signals specific bitmap (e.g. for SSB/CSI-RS), the UE may be configured to provide full bitmap information, including bitmap of all DL RS that have been configured in the system (i.e. occupied SSB time locations) or SSBs that are configured for L1-RSRP/CSI reporting. In one example, the bitmap or a partial bitmap may comprise information on specific set of reference signals relevant for MPE e.g. reference signals/resource associated with PUCCH/PUSCH transmission. In one example (a full) bitmap information may comprise a larger or wider set of reference signals than what is configured by the network apparatus or associated for current PUCCH/PUSCH transmission by the UE.

When providing the full bitmap information, the UE may indicate which downlink reference signal resources are affected and/or are unaffected by the MPE and could serve as potential spatial relation reference signals for uplink transmissions. This information may be provided regardless of the MPE indication method above. As an example, this indication may be transmitted by the UE when the UE indicates that all the resources in the configured MPE indication are affected or, N out of M resources are affect (where N is less than or equal to M; N 1, 2, 3 . . . <=M)

The bitmap may be transmitted using a Random Access Channel procedure and/or be multiplexed on any available uplink grant if the corresponding uplink is not affected by the MPE (i.e. the resource used for transmitting on the said grant). As one example, the affected/unaffected resource list may be based on the TCI State list for the Physical Downlink Shared Channel, as described above.

In one example, the network apparatus may configure the UE with a reference signal type that is used to construct the bitmap. In another example, the bitmap type may be pre-configured in the UE. Based on the configured reference signal type, whenever the network apparatus configures UE with new transmission configurations (e.g. for PUCCH/PUSCH/PDCCH/PDSCH), the UE may update the association of a bit location in the bitmap. This association may also be known at the network apparatus. As an example, the bitmap may be constructed according to any of: the resource ID, the antenna panel ID, the TCI state ID/, the ink ID, the beam ID or the like, as these are identifiers that can be indicated/referred to by the UE when identifying resources affected by the MPE. In other words, an indication of a resource identifies a beam/link that is directly affected, or the resource indirectly indicates at least one beam/link that is affected by an MPE event (e.g. through a spatial relation between the indicated beam/link and an indicated resource).

As one example of bitmap constructing, if there are resource identities #1, #2, #3, #4 (which may be, for example, downlink reference signals that are considered as spatial relation reference signals to uplink channels such as PUCCH/PUSCH, or they may be antenna panel IDs or SRS resource set IDs or the like), these resource identities may be mapped to the bit locations 1 to 4 in the bitmap. In a further example if there is an update of resource IDs so that for, for example PUSCH/PUCCH transmission, the resource identities #1, #2, #3 and #4 are updated to be #3, #4, #5, #8 respectively, those resources would correspond to the same bit locations (1 to 4 in sequence) in the map. It is understood that these are merely examples, and that other mechanisms for mapping resources/link/beams may be configured for MPE reporting instead (e.g. instead of ascending order, a descending order may be used). The bitmap may also have variable length that is determined by the resource configuration. As another example, the resources may also be identified so that, for example, resource identity #1 is a logical resource ID and the actual reference signal may be changed while the identity stays the same. In this case, the UE may update the associated reference signal of the resource identity #1 while the bit location in the bit map does not change.

Figure 2:
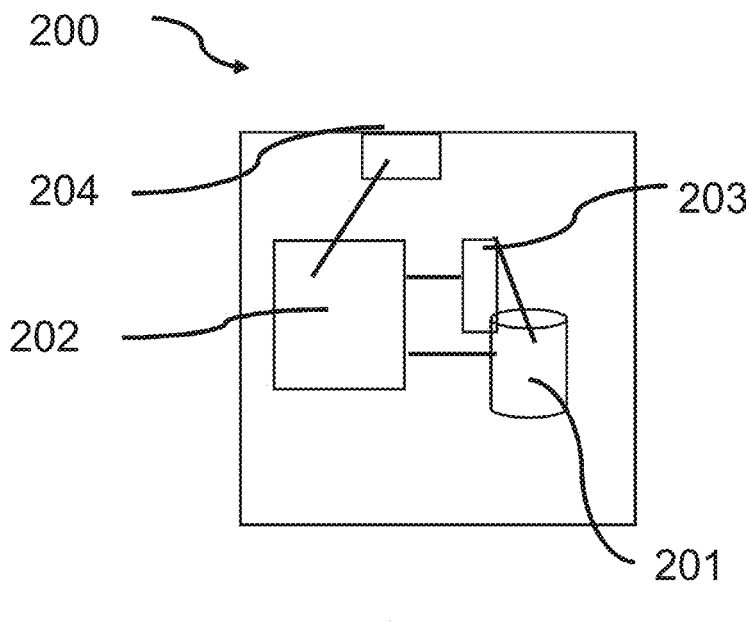
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
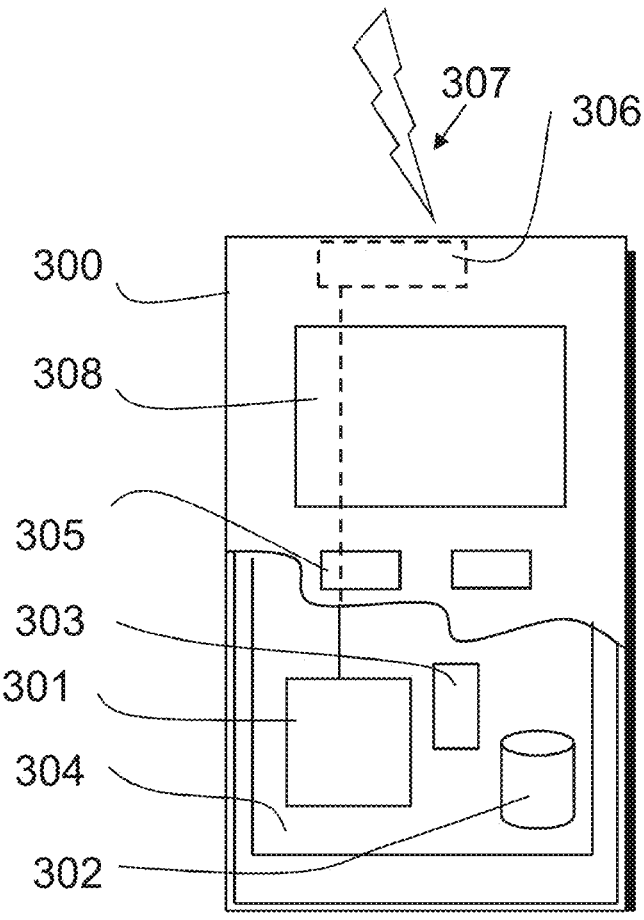
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
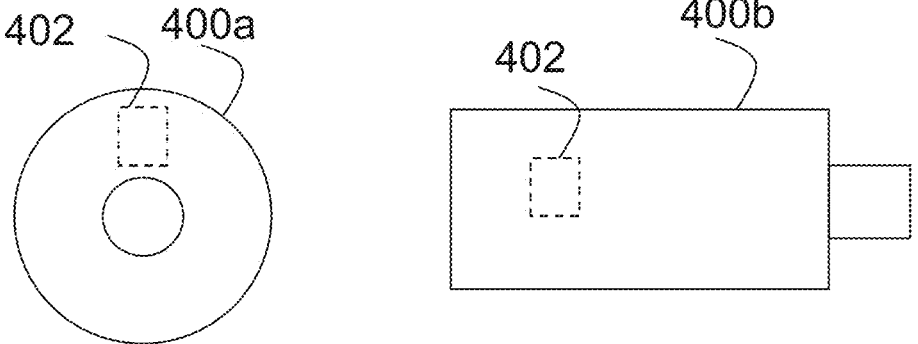
FIG. 4 shows a schematic representation of a non-volatile memory medium storing instructions which when executed by a processor allow a processor to perform one or more of the steps of the methods of some embodiments.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIGS. 6 to 7.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 6 and 7, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for a terminal, the apparatus comprising:
at least one memory configured to store instructions; and
at least one processor configured to execute the instructions and cause the apparatus to perform:
determining that at least one uplink resource is associated with a reduced uplink transmission power complying with a maximum permissible exposure (MPE) requirement; and
transmitting an identification of the at least one uplink resource to a network apparatus, wherein the identification indicates the at least one uplink resource using identifiers of at least one synchronization signal/physical broadcast channel block (SSB) and/or channel state information resource signal (CSI-RS), and wherein the identification is comprised within a bitmap;

the apparatus being further caused to perform:

receiving configuration information that configures the apparatus such that the determining comprises comparing a measured value of at least one parameter to at least one associated threshold for that parameter.

2. An apparatus as claimed in claim 1, wherein there are at least first and second parameters of said at least one parameters with respective first and second thresholds.

3. An apparatus as claimed in claim 1, wherein at least one of the at least one parameters has associated first and second thresholds, wherein the second threshold corresponds to a larger reduction in uplink transmission power than the first threshold, and wherein, when only said first threshold is exceeded, the transmitting transmits at least one identification of those uplink resources assigned to the terminal for uplink transmission that are affected by said power reduction; and when both of said first and second thresholds are exceeded, the transmitting transmits at least one identification of those uplink resources unassigned to the terminal for uplink resources that are affected by said power reduction.

4. An apparatus as claimed in claim 1, wherein the bitmap identifies at least one uplink resource that is not associated with a reduced uplink transmission power.

5. An apparatus as claimed in claim 1, wherein the apparatus is further caused to perform:

updating the bitmap in dependence on the uplink resource configuration.

6. An apparatus as claimed in claim 1, wherein a single identity is used to identify a plurality of uplink resources that are associated with a reduced uplink transmission power.

7. An apparatus as claimed in claim 1, wherein the apparatus is further caused to perform:

sending a cancellation indication to the network apparatus when the apparatus determines that an event causing the reduced uplink transmission power has passed.

8. An apparatus as claimed in claim 1, wherein the apparatus is further caused to perform:

determining whether or not the apparatus is scheduled to transmit on at least one resource of a physical uplink shared channel and a physical uplink control channel that is associated with the reduced uplink transmission power; and wherein the transmitting transmits said identification in response to determining that the apparatus is scheduled to transmit on at least one resource of a physical uplink shared channel or a physical uplink control channel that is associated with the reduced uplink transmission power.

9. A network apparatus, the network apparatus comprising:

at least one memory configured to store instructions; and at least one processor configured to execute the instructions and cause the network apparatus to perform:

receiving from a terminal an identification of at least one uplink resource associated with a reduced uplink transmission power by the terminal, the reduced uplink transmission power complying with a maximum permissible exposure (MPE) requirement, wherein the identification indicates the at least one uplink resource using identifiers of at least one synchronization signal/physical broadcast channel block (SSB) and/or channel state information resource signal (CSI-RS), and wherein the identification is comprised within a bitmap;

the network apparatus being further caused to perform:

transmitting configuration information that configures the apparatus to determine that at least one uplink resource is associated with a reduced uplink transmission power, wherein the configuration information comprises comparing a measured value of at least one parameter to at least one associated threshold for that parameter.

10. A network apparatus as claimed in claim 9, wherein there are at least first and second parameters of said at least one parameters with respective first and second thresholds.

11. A network apparatus as claimed in claim 9, wherein at least one of the at least one parameters has associated first and second thresholds, wherein the second threshold corresponds to a larger reduction in uplink transmission power than the first threshold, and wherein, when only said first threshold is exceeded, the receiving receives at least one identification of those uplink resources assigned to the terminal for uplink transmission that are affected by said power reduction; and when both of said first and second thresholds are exceeded, the receiving receives at least one identification of those uplink resources unassigned to the terminal for uplink resources that are affected by said power reduction.

12. A network apparatus as claimed in claim 9, wherein the identification is comprised within a bitmap.

13. A network apparatus as claimed in claim 9, wherein the bitmap identifies at least one uplink resource that is not associated with a reduced uplink transmission power.

14. A network apparatus as claimed in claim 9, wherein a single identity is used to identify a plurality of uplink resources that are associated with a reduced uplink transmission power.

15. An apparatus as claimed in claim 9, wherein the apparatus is further caused to perform:

receiving a cancellation indication from the terminal indicating that an event causing the reduced uplink transmission power has passed.

* * * * *